United States Patent [19]

Dohogne et al.

[11] Patent Number: 4,841,183
[45] Date of Patent: Jun. 20, 1989

[54] DYNAMOELECTRIC MACHINE CONSTRUCTION AND METHOD

[75] Inventors: L. Ranney Dohogne; Raymond D. Heilman, both of St. Louis, Mo.

[73] Assignee: Emerson Electric Co., St. Louis, Mo.

[21] Appl. No.: 923,480

[22] Filed: Oct. 27, 1986

[51] Int. Cl.$^4$ .............................................. H02K 5/16
[52] U.S. Cl. ...................................... 310/90; 310/89; 310/91; 310/258; 277/88; 384/141; 384/142; 384/420; 384/481
[58] Field of Search .................... 310/90, 258, 89, 91, 310/71, 261, 41, 157; 277/88, 93 R, 93 SD, 92, 81 R; 384/141, 142, 481, 420, 424

[56] References Cited

U.S. PATENT DOCUMENTS

| | | | |
|---|---|---|---|
| 1,914,759 | 6/1933 | Schwitzer | 384/142 |
| 2,114,489 | 4/1938 | Grisell | 384/141 |
| 2,622,942 | 12/1952 | Munoz | 384/142 |
| 2,728,591 | 12/1955 | Solari | 277/93 R |
| 3,321,654 | 5/1967 | Allendorph | 310/258 |
| 3,544,820 | 12/1970 | Wightman | 310/89 |
| 3,707,037 | 12/1972 | Gutris | 310/89 |
| 3,967,341 | 8/1976 | Colley | 384/481 |
| 3,997,805 | 12/1976 | Dochterman | 277/88 |
| 4,121,841 | 10/1978 | Hiraga | 277/93 SD |
| 4,437,027 | 3/1984 | Yamamoto | 310/71 |
| 4,502,694 | 3/1985 | Uhrner | 277/88 |

FOREIGN PATENT DOCUMENTS

| | | | |
|---|---|---|---|
| 0644175 | 6/1964 | Belgium | 277/88 |
| 1047552 | 12/1958 | Fed. Rep. of Germany | 277/88 |
| 3038135 | 4/1981 | Fed. Rep. of Germany | 310/90 |
| 2065243 | 6/1981 | United Kingdom | 277/88 |
| 2075615 | 11/1981 | United Kingdom | 277/88 |
| 2091823 | 8/1982 | United Kingdom | 277/88 |
| 2152295 | 7/1985 | United Kingdom | 310/89 |
| 2172754 | 9/1986 | United Kingdom | 310/89 |

Primary Examiner—R. Skudy
Attorney, Agent, or Firm—Polster, Polster and Lucchesi

[57] ABSTRACT

A dynamoelectric machine or electric motor construction is disclosed in which the motor has a cylindrical shell having a stator core press-fitted therein and positioned axially with respect to the shell at a predetermined position. The stator core has a central bore which rotatably receives a rotor assembly, the latter having a rotor shaft extending outwardly from each end thereof. An end shield is press-fitted into each end of the cylindrical shell to a predetermined axial position thereby to support bearings journaling the rotor shaft, with the rotor shaft extending axially outwardly through one of the end shields for connection to its application. This one end shield has a seal which is maintained in perpendicular relation to the rotor shaft and which slidingly seals the interior of the motor relative to the end shield and to the rotary application and rotor shaft. The end shields have outer circular flanges which fit in face-to-face engagement with the inner surfaces of the cylindrical housing and which are bonded thereto for sealingly securing the end shields in position with respect to the housing. The housing has an outwardly extending flange at at least one thereof permitting the motor to be mounted to its application.

2 Claims, 1 Drawing Sheet

DYNAMOELECTRIC MACHINE CONSTRUCTION AND METHOD

BACKGROUND OF THE INVENTION

This invention relates to dynamoelectric machines, and more specifically to electric motors and to a method of constructing electric motors. Even more specifically, this electric motor construction relates to a sealed electric motor which may be utilized in submerged or wet environments, such as submersible or sump pump applications.

Typically, a dynamoelectric or electric motor construction, particularly for fractional horsepower motors, comprises a stator assembly fitted into a cylindrical housing. Then, die cast or stamped metal end shields or bearing supports are applied to the ends of the housing and are secured thereto by through bolts extending from one of the end shields through the stator assembly to the other end shield. Alternatively, the end shields may be bonded to the ends of the housing with a suitale adhesive or may be welded thereto. Oftentimes, special tabs or mounting brackets are secured to the outer surfaces of the housing so as to permit the motor to be mounted with respect to its application.

While these prior art electric motor designs worked well for their intended purposes, the requirement of separately securing the end shields in place and providing mounting brackets was relatively time consuming and expensive during the manufacture of such motors. Also, in applications for submerged pumps and the like, the requirement of through bolts required that the through bolts be sealed.

Additionally, in motors utilized in pump applications or the like, it is often necessary to provide a seal around the rotor shaft of the motor so as to prevent leakage of water into the motor and to prevent lubricating oil and the like within the motor from leaking therefrom. Many such motors utilize part-spherical, self-aligning bearings such that the rotor shaft is journaled with respect to the end shields or bearing supports without binding in the journal bearings. These self-aligning bearings permit the axis of the rotor shaft to be disposed at a slight angle with respect to the diametric plane of the bearing supports or end shields such that the outer surfaces of the rotor shaft engageable with a seal carried by the end support may be somewhat skewed with respect to the sealing surfaces of the seal so as to possibly result in an imperfect seal or so as to result in undue wear on one side of the seal.

SUMMARY OF THE INVENTION

Among the several objects of this invention may be noted the provision of the construction of a dynamoelectric machine or electric motor in which the housing or shell of the motor secures the end shields in place without the requirement of fasteners or the like, and in which the housing accurately locates the end shields with respect to the rotor asssembly;

The provision of such a dynamoelectric machine in which a seal carried by the end shield is aligned with respect to the axis of the rotor shaft regardless of angular alignment of the rotor shaft with respect to the end shield within the limits permitted by the self-aligning bearings used to journal the rotor shaft;

The provision of such a dynamoelectric machine which is easy to assemble and in which a sealed assembly may be readily achieved during high volume production with a high degree of confidence;

The provision of such a dynamoelectric machine in which the dynamoelectric machine may be secured to its application without the requirement of mounting brackets or the like separately secured to the housing of the dynamoelectric machine; and The provision of such a dynamoelectric machine and method of assembly thereof which is inexpensive to manufacture and assemble, which is of rugged construction, and which has a long service life.

Other objects and features of this invention will be in part apparent and in part pointed out hereinafter.

Briefly stated, a dynamoelectric machine or electric motor of the present invention comprises a cylindrical shell. A stator core is provided having an outer periphery, a central bore, and a plurality of slots extending radially outwardly from the central bore, with windings inserted in the slots. The stator core is sized relative to the diameter of the housing so as to be positively secured within the housing when the stator core is forceceably inserted within the housing. A rotor assembly is rotatably received within the central bore of the stator core, and has a rotor shaft extending outwardly therefrom. A bearing support at each end of the shell is provided, and a bearing is carried by each of the bearing supports for receiving and journaling the rotor shaft. Each of the bearing supports has an outer periphery so sized relative to the shell such that the bearing supports are secured with respect to the shell by being press-fit therewithin with the bearing supports aligning the bearings carried thereby with respect to the rotor shaft, and with the rotor body being substantially centered with respect to the central bore of the stator.

BRIEF DESCRIPTION OF THE DRAWINGS

Corresponding reference characters indicate corresponding parts throughout the several views of the drawings.

DESCRIPTION OF A PREFERRED EMBODIMENT

Figures 1, 2:
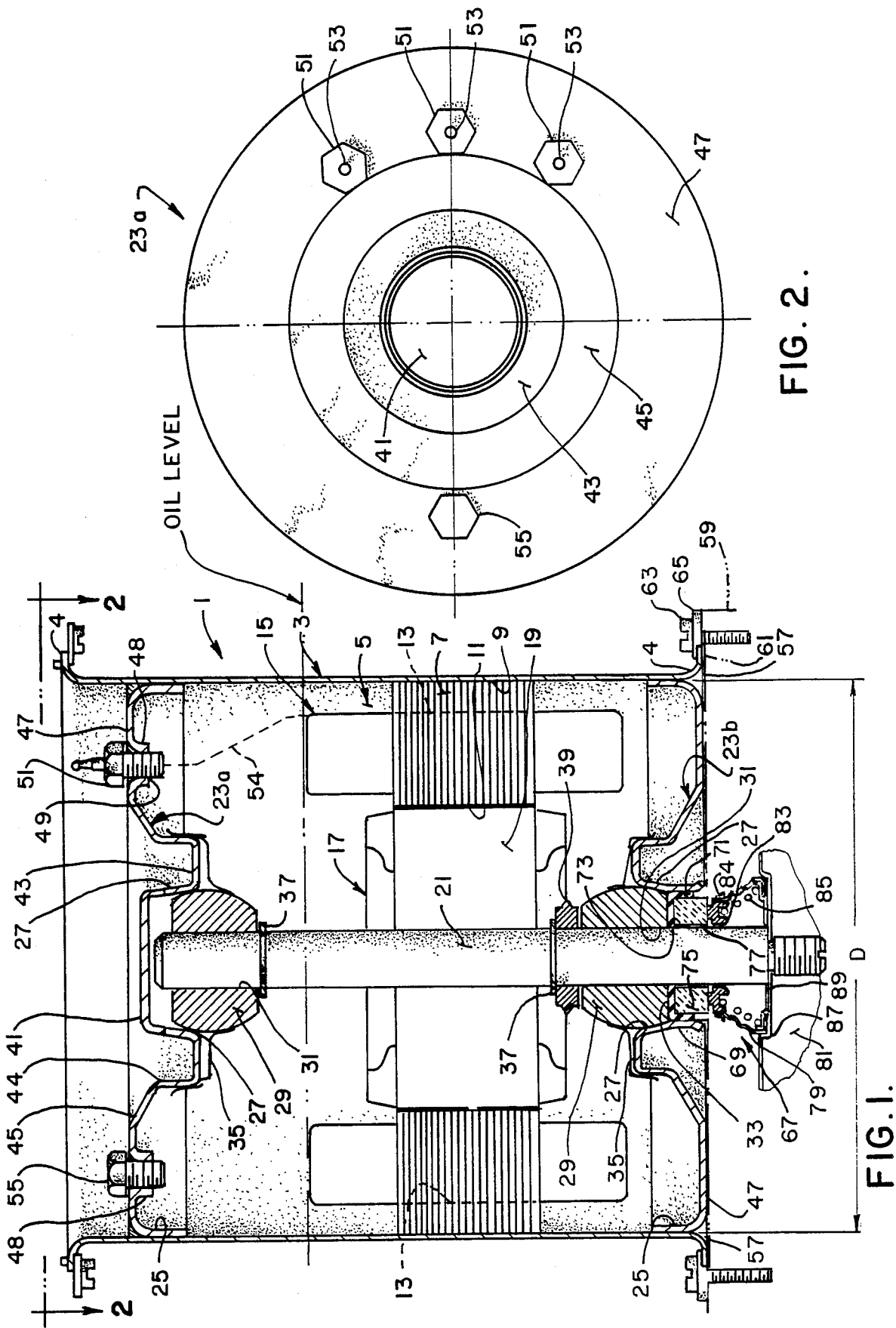
FIG. 1 is a vertical cross sectional view of a dynamoelectric machine (electric motor) of the present invention, illustrating the motor as it is secured to its application, the latter being shown in phantom.
FIG. 2 is a top plan view of the motor.

Referring now to the drawings, a dynamoelectric machine or electric motor of the present invention is indicated in its entirety by reference character 1. The electric motor 1 has a cylindric housing or shell, as generally indicated at 3, having a substantially constant internal diameter D. At each end of shell 3, an outwardly protruding flange, as indicated at 4, is integrally formed with the shell. A stator assembly, as generally indicated at 5, is secured (i.e., preferably press-fitted) into shell 3 so as to securely fix the stator assembly within the shell. As is conventional, stator assembly 5 comprises a stator core 7 made of a plurality of stacked laminations of suitable ferromagnetic material. The core has an outer periphery 9 which, as mentioned above, is so sized as to be press-fit within the inner diameter of shell 3. Further, stator core 7 has a central bore 11 extending axially therethrough. A plurality of radially extending slots 13 is provided in the stator core, with these slots receiving coils of magnet wire constituting the windings 15 of the stator assembly.

As indicated generally at 17, a rotor assembly is rotatably received within central bore 11 of stator core 7. The rotor assembly includes a squirrel cage rotor body 19 which is received within the central bore 11. A rotor shaft 21 extends outwardly from the end of the rotor body 19.

In accordance with this invention, bearing supports or end shields, as generally indicated at 23a, 23b, are inserted into the open ends of shell 3 and are secured thereto. In a manner as will be disclosed, these bearings supports or end shields receive a respective outer end of rotor shaft 21 and journal the rotor shaft while maintaining the rotor body 19 substantially centered within central bore 11 of stator core 7. As shown, each of the end shields 23a, 23b is a unitary solid member preferably of stamped steel construction. Each of the end shields has a peripheral flange 25 which extends axially inwardly of the shell 3 and which is so sized so as to have a diameter substantially equal to (or slightly greater than) the inner diameter D of shell 3 such that the end shields may be press-fit and secured within the open ends of the shell. Further, each of the end shields has a bearing race 27 formed therein generally laterally aligned and structurally supported by each associated peripheral flange 25 for receiving a part-spherical, self-aligning bearing 29. Each of these bearings has a bearing bore 31 for receiving and journaling a respective outer end of rotor shaft 21. The bearing 29 received by the bearing race 27 of end shield 23b has a flat outer end 33 which is perpendicular to the axis of the rotor shaft for purposes as will appear. Each of the bearings 29 is held in place with respect to its respective bearing race 27 on its respective end shield 23a, 23b by a bearing retainer 35. Grooves are provided in rotor shaft 21 and thrust transfer rings 37 are provided in these grooves for substantially fixing rotor body 19 in axial position with respect to bearings 29. A thrust bearing 39 is provided between thrust transfer ring 37 and the inner end face of the bearing member 29 received by end shield 23b for transmitting thrust loads between the rotor assembly 17 and end shield 23b.

As indicated at 41, end shield 23a has a center cup 41 formed therein for receiving the outer or back end of rotor shaft 21 with the inner portion of the cup forming bearing race 27. A circular rim 43 surrounds this center cup. A vertical wall 44 extends upwardly (axially outwardly) from rim 43, and an inclined web 45 extends outwardly from wall 44 to a planar outer surface 47 of end shield 23a. A plurality of bosses 48 is provided in the planar outer face 47 of end shield 23a, with each of these bosses having a threaded terminal pass-through aperture 49 formed therein. In accordance with this invention, an electrical terminal body 51, typically of an electrically insulative synthetic resin material, is threadably secured within the threaded terminal pass-through apertures 49 at three locations, as indicated on the right-hand side of end shield 23a illustrated in FIG. 2. These terminal bodies have electrical terminals 53 sealably secured therewithin so as to permit the windings 15 of stator assembly 5 to be electrically connected by lead wires 54 (shown in dotted lines) to a source of electrical power and to control switches on the exterior of shell 3 and of end shields 23a, 23b.

Located diametrically opposite these three terminal bodies, a plug 55 is inserted into another of the threaded apertures 49 and another of the bosses 48. The locations of plugs 55 in end shield 23a, as shown in FIG. 2, correspond to the locations of bosses 48 in the end shield which receive the plugs. This plug permits a lubricating and motor cooling medium, such as high dielectric strength transformer oil or the like to be added to the motor for lubricating rotor shaft 21 within bearings 29 and for transferring excess heat from the motor As shown in FIG. 1, motor 1 of the present invention is normally operated in a vertical position, with the end shield 23b constituting the bottom of the motor. Typically, sufficient lubricating oil is added to the interior of the motor such that the lowermost bearing 29 and winding 15 are submerged within the lubricating oil. The preferred oil level is shown in FIG. 1 to be slightly above the level of the end turns of windings 15. It will be appreciated that since the load driven by the motor is attached to the bottom end of rotor shaft 21, the lowermost bearing 29 will transmit most of the radial and thrust loads between the rotor assembly and the load. Preferably, bearings 29 are of powdered metal construction and are preimpregnated with a lubricant such that the service life of the bearings, particularly the upper bearing, is not dependent on oil within the motor for lubrication.

As heretofore noted, end shields 23a, 23b have peripheral flanges 25 which extend axially, and preferably axially, inwardly of shell 3. Further, as previously mentioned, the outside diameter of these flanges is substantially equal to or slightly less than the inner diameter D of shell 3. Thus, upon press-fitting the end shields 23a, 23b into the open ends of shell 3, the end shields 23a, 23b are secured with respect to the shell and are positively held in place therewithin. Preferably, an adhesive, such as an epoxy material, is applied to the inner face between flanges 25 of the end shields and the inner faces of the shell 3, this adhesive being indicated as a bead 57. It will be appreciated that this adhesive serves the dual function of bonding (securing) the end shields with respect to the shell, and also positively seals the end shields with respect to the shell.

As generally indicated at 59, an application (e.g., a submersible pump housing or the like) is shown (in phantom) to be secured to shell 3. More specifically, a plurality of screws or other threaded fastener devices 63 threadably engage application 61. Enlarged heads or washers 65 are provided on screws 63 such that with the screws at spaced at spaced angular intervals around shell flange 4, the screw heads engage shell flange 4 and thus secure motor 1 to the application. It will be understood that a seal (not shown) can be provided between the outer face of shell flange 4 and the cooperating surface on its application thereby to positively seal the end of the motor with respect to its application, if such seal is desired.

As indicated above, lubricating oil is preferably sealed within shell 3 for lubricating bearings 29. Additionally, one application of a can motor design of the present invention is for a submerged or sump pump. In these conditions, it is desirable to have a seal, as generally indicated at 67, for sealingly engaging end shield 23b and rotor shaft 21 so as to entrap the lubricating oil within the motor and so as to prevent leakage of water or other liquids into the interior of the motor while permitting rotation of the rotor shaft.

More specifically, end shield 23b is a unitary stamped steel member having a central opening therethrough, the inner portion of the end shield defining this opening diverging outwardly toward the inside of the motor so as to constitute bearing race 27 for receiving spherical bearing member 29 journaling the outer end of rotor shaft 21. Located axially outwardly from bearing race 27 is a generally cylindrical wall portion 69 which is concentric with bearing race 27 and which extends axially outwardly generally to the outer planar face 47 of end shield 23b. A seal, as generally indicated at 67, is received in a cylindrical wall portion (alternatively, i.e. seal bore) 69 of end shield 23b so as to seal the outer surface of rotor shaft 21.

Seal 67 comprises an elastomeric cup 71 having a central opening 73 which is press fit into the inner surfaces of cylindrical wall portion 69. An annular ceramic ring 75, which remains stationary with respect to shaft 21, is press into elastomeric cup 71. Ceramic ring 75 has a central bore 77 which surrounds, but which is clear of, shaft 21. Seal 67 further comprises an elastomeric, spring biased boot 79 which is sealed with respect to an application member (e.g., a pump impeller) 81 driven by motor 1. Boot 79 has a carbon seal 83 carried on the upper end thereof which rotates with impeller 81 and which slidingly, sealingly engages the bottom face of ceramic ring 75. A clamp ring 84 sealably secures the upper end of boot 79 to carbon seal 83. A compression spring 85 is disposed within boot 79 for biasing seal 83 into sealing engagement with ceramic ring 75. The lower end of boot 79 is sealingly secured to a metal retainer 87 which in turn is pressed into a blind counter bore 89 in impeller 81 so as to seal the shaft with respect to the impeller.

In accordance with this invention, by providing end 33 on bearing 29 which is perpendicular to the axis of shaft 21 received therein, regardless of the angular orientation of rotor shaft 21 with respect to end shield 23b as permitted by self-aligning bearings 29, it is insured that when elastomeric cup 71 and ceramic ring 75 are pressed into cylindrical wall portion 69 of end shield 23b, they are in face-to-face engagement with bearing face 33 and with each other so as to provide a uniform sliding, sealing fit between the rotating carbon seal 83 and stationary ceramic ring 75. This insures a sliding seal between the ceramic ring 75 and carbon seal 83 substantially without wobble. It will be understood that the press fit of elastomeric cup into cylindrical bore 69 of end shield 23b seals the bore. Further, the press fit of retainer 87 and boot 79 into recess 89 of application member 81 forms a seal with the application member. Also, the sliding seal between rotary carbon seal 83 and stationary ceramic ring 75 forms a third seal. The lubricating oil in housing 3 flows down around shaft 21 through opening 77 in ring 75 and fills the interior of boot 79.

In accordance with this method of this invention, stator core 7, with windings inserted therein, is press-fitted into one open end of shell 3 to a predetermined axial depth or location. Then, one of the end shields 23a or 23b is press-fitted into its respective open end of the shell to a predetermined axial depth. Upper end shield 23a together with the upper bearing 29 installed thereon is press fitted into its respective upper end of the shell until the outer planar face 47 of end shield 23a is located at a desired position within shell 3. Rotor assembly 17, together with bearings 29, is then inserted into the shell such that the upper end of the rotor shaft is received within bearing bore 31 of the upper bearing 29. This will position rotor body 17 within rotor bore 11 in the approximate position shown in FIG. 1. Then, the lower end shield 23b, with its respective lower bearing 29 held in place by its respective bearing retainer 35, is inserted onto the lower end of the rotor shaft and the lower end shield 23b is press-fitted into place to a desired depth such that the inner perpendicular face of the lower bearing member 29 is in abutting relationship to the thrust washer 39 carried by rotor shaft 21. Then, seal 67 is installed in cylindrical bore 69 and on application 81. Thus, with the stator core 7 and the two end shields press-fit into place, all components of motor 1 are accurately located with respect to housing 3. At this point of the assembly, fit checks and operational checks of the motor may be made. If errors or defects in dimensional alignment are found, the motor may be disassembled and the defects corrected. Epoxy material 57 is then applied to the interface between the flanges 25 of end shields 23a and 23b and the inner cylindric face of housing 3 so as to bond and seal the end shields in place with respect to housing 3.

In view of the above, it will be seen that the other objects of this invention are achieved and other advantageous results obtained.

As various changes could be made in the above constructions or method without departing from the scope of the invention, it is intended that all matter contained in the above description or shown in the accompanying drawing shall be interpreted as illustrative and not in a limiting sense.

What is claimed is:

1. A dynamoelectric machine comprising a cylindrical housing, a stator core having an outer periphery, said stator core having a central bore therethrough and a plurality of slots extending radially outwardly from said central bore, windings inserted in said slots, said stator core being sized relative to said housing so as to be positively secured within said housing when said stator core is forceably inserted into said housing, a rotor rotatably received within said stator core bore, a rotor shaft extending outwardly from said dynamoelectric machine, a bearing support at each end of said housing, a bearing carried by each of said bearing supports for receiving and journaling said rotor shaft, wherein one of said bearing supports has a central opening through which said rotor shaft extends for connection to an application member, the inner portion of said central opening constituting a bearing race, said rotor shaft being journaled by a bearing received in said bearing race, said bearing having an outer end face perpendicular to said rotor shaft, the outer portion of said central opening being generally cylindrical and constituting a seal bore, said application member being carried by and being rotatable with said rotor shaft, a seal between said seal bore and said application member for slidably sealing said shaft and application member with respect to said bearing, said seal having a first seal portion sealed with respect to said seal bore, a central seal opening for receiving said rotor shaft, an outer cylindrical wall for sealing said seal with respect to said seal bore of said bearing support and an inner face substantially perpendicular to said central opening of said bearing support for being in face-to-face abutting relation with said outer end of said bearing thereby to at least in part align said seal with respect to said bearing and to said shaft, and a second seal portion sealed with respect to said application member, said first seal portion being stationary with said seal bore, said second seal portion being rotary with said application member and rotor shaft, a stationary sealing surface carried by said first seal portion, and a rotary seal member having a rotary sealing surface, said rotary seal member being carried by a said second seal portion with said rotary sealing surface being in face-to-face sliding, sealing engagement with said stationary sealing surface of said first seal portion.

2. A dynamoelectric machine as set forth in claim 1 wherein said second seal portion comprises an elastomeric boot carrying said rotary sealing surface, and a spring for biasing said rotary sealing surface into said aforementioned face-to-face sliding, sealing engagement with said stationary sealing surface of said first seal portion.

* * * * *